(No Model.)  2 Sheets—Sheet 1.

D. B. SPOONER.
PROPORTIONAL WATER METER.

No. 341,515. Patented May 11, 1886.

WITNESSES:
Fred. G. Dieterich.
Wm. T. Emerson.

INVENTOR.
D. B. Spooner by
H. W. Beadle & G.
ATTORNEYS.

(No Model.) 2 Sheets—Sheet 2.
D. B. SPOONER.
PROPORTIONAL WATER METER.
No. 341,515. Patented May 11, 1886.
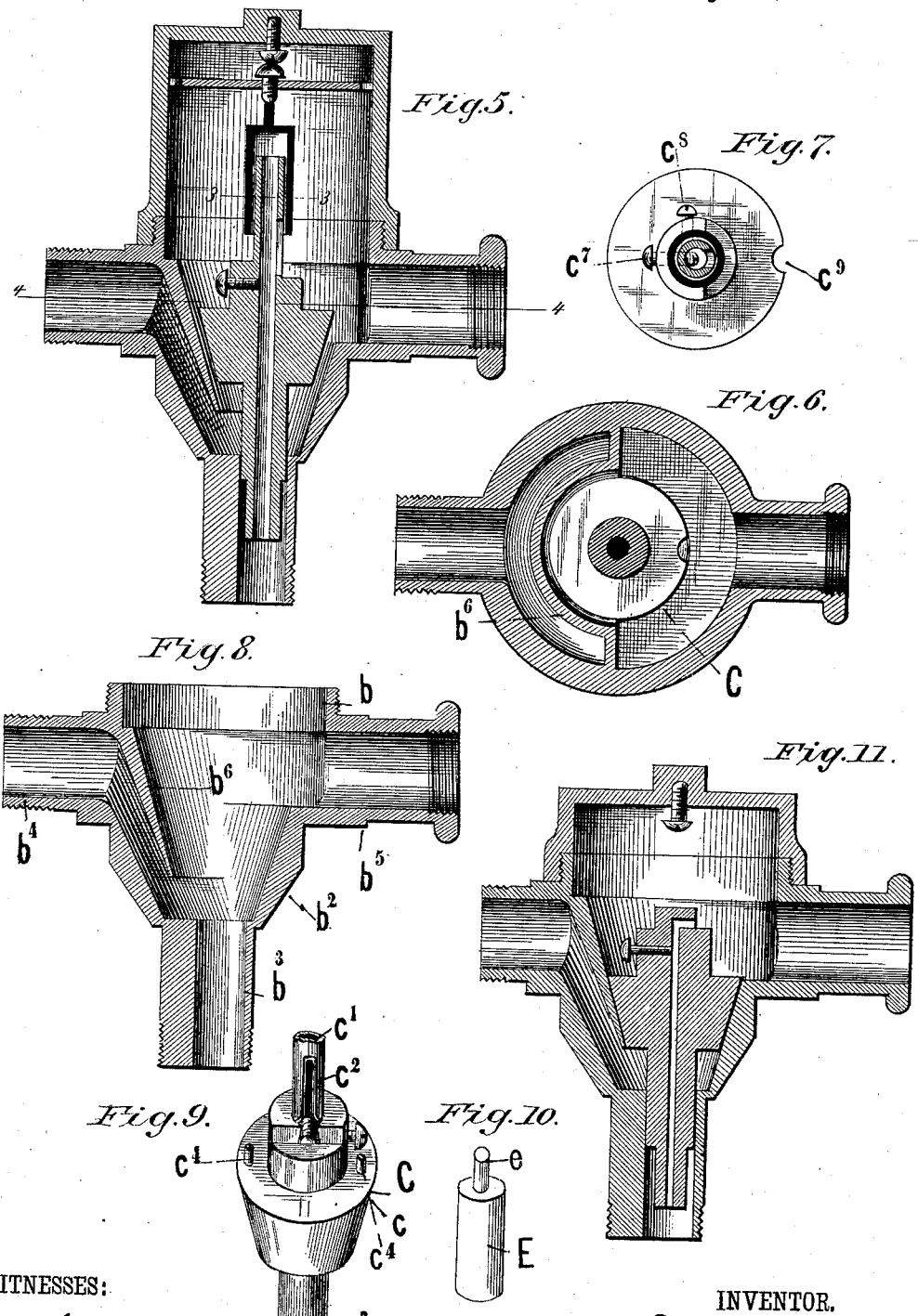
WITNESSES:
Fred. G. Dieterich
Wm. T. Emerson
INVENTOR.
D. B. Spooner by
H. W. Beadle & G.
ATTORNEYS.

UNITED STATES PATENT OFFICE.

D. BRAINERD SPOONER, OF BOSTON, MASSACHUSETTS.

PROPORTIONAL WATER-METER.

SPECIFICATION forming part of Letters Patent No. 341,515, dated May 11, 1886.

Application filed February 3, 1885. Serial No. 154,857. (No model.)

*To all whom it may concern:*

Be it known that I, D. BRAINERD SPOONER, of Boston, in the county of Suffolk and State of Massachusetts, have invented certain new and useful Improvements in Water-Measuring Apparatus, of which the following is a full, clear, and exact description.

This invention relates to that class of water-measuring apparatus which has for its distinguishing characteristic the passage through the meter of only a small proportional portion of the entire volume of water used, this small proportion being diverted to an auxiliary water-way, in which the meter is located, by means of an obstructing device located in the main water-way; and it consists mainly, first, of the combination of the following elements: a main water-way, an auxiliary water-way, a removable independent unattached obstruction-block of proper weight located in the main water-way, and adapted to divert a proportional amount of the entire flow to the auxiliary water-way; and, second, in the combination, with an independent unattached obstruction-block, of an independent unattached obstruction-cap.

It further consists in certain other combinations, and in certain peculiarities of construction, which, in connection with the foregoing, will be fully described hereinafter.

Figure 1:
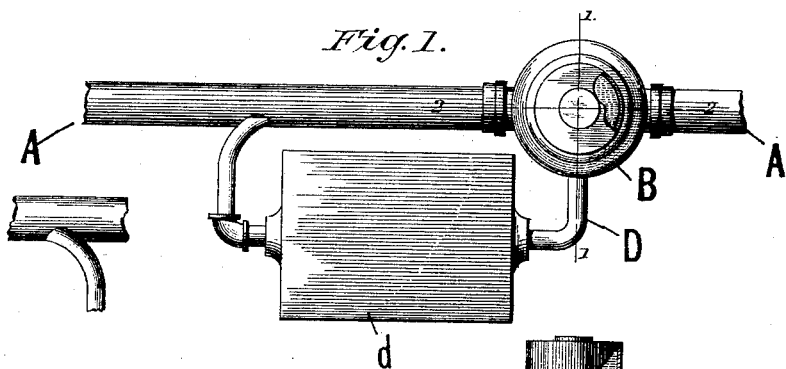
Figure 2:
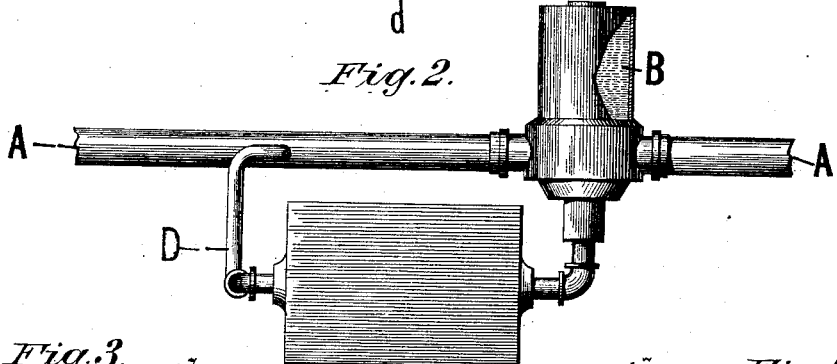
Figure 3:
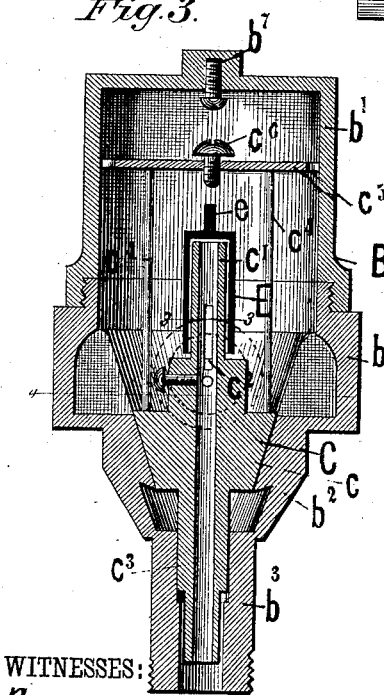
Figure 4:
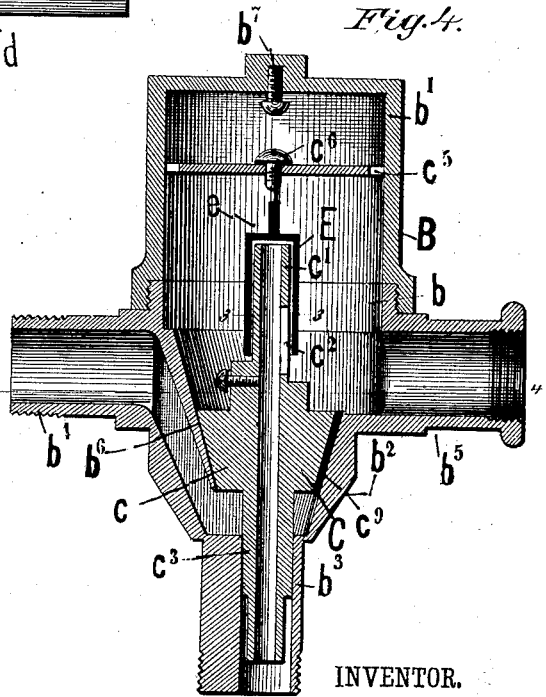

In the drawings, Figure 1 represents a plan view of my proportional measuring apparatus, showing the relative arrangement of the parts; Fig. 2, a side view of the same; Figs. 3 and 4, enlarged vertical sectional views on lines 1 1 and 2 2, Fig. 1; Fig. 5, an enlarged vertical section like Fig. 4, excepting that the block is represented in its raised position. Figs. 6 and 7 are horizontal sections on lines 3 3 and 4 4 of Fig. 4, Fig. 6 on line 4 4, and Fig. 7 on line 3 3; Fig. 8, a sectional view of the lower division of the casing; Fig. 9, perspective view of the obstruction-block; Fig. 10, a perspective view of the obstruction-cap, and Fig. 11 a sectional view of a modified form of construction.

To enable others skilled in the art to make and use my invention, I will proceed to describe fully the construction and operation of the same.

For convenience and clearness the apparatus will be described under several heads, as follows: first, the main water-way; second, the casing located therein; third, the obstruction-block; fourth, the auxiliary water-way; and, fifth, the obstruction-cap.

1. *The main water-way.*—A A, Figs. 1 and 2, represent the ordinary pipes of the main water-way, and B represents a casing of special construction adapted to hold the obstruction-block, which casing is located in the main water-way at any proper point, as shown, the connection between the pipes and the casing being made by coupling-joints, in the manner well understood. The essential feature of the main water-way is that it shall have at some proper point a casing, B, or other suitable means for properly holding the obstruction-block hereinafter referred to.

2. *The casing*—B, Figs. 1, 2, 3, and 4, represents the casing, before referred to, in which the obstruction-block is located, which casing may be constructed, generally, of any proper form, but is shown with an enlarged central cylindrical portion, $b$, Figs. 3, 4, and 8, having screw-threads on its upper edge, an upper cylindrical portion, $b'$, having screw-threads on its lower edge, a conical lower portion, $b^2$, and tubular portion $b^3$, the latter having screw-threads on its lower end, as shown, to make connection with the pipe of the auxiliary water-way, as will be hereinafter described. $b^4$, Fig. 4, represents a tubular portion projecting from the inlet side of the casing, and $b^5$ a similar portion projecting from the outlet side of the casing, each portion having threaded ends for the purpose of making connection with the adjacent pipe lengths of the main water-way, in the manner well understood. By means of the screw-threads upon the upper edge of the cylindrical portion $b$, and the corresponding screw-threads on the lower edge of the upper cylindrical portion, $b'$, a removable connection is made for the purpose of permitting the ready removal of the upper cylindrical portion when it is desired to inspect the interior of the casing. $b^6$, Figs. 4 and 8, represents a plate or partition portion projecting downward from the solid portion of the inner wall of the casing into such position relatively to the inlet-opening as to serve as a deflecting-plate for changing the direction of the current, as will be fully described hereinafter. The purpose of the casing B is to furnish in the main water-way a suitable chamber for properly holding the obstruction-block. $b^7$, Figs. 3 and 4, represents an adjusting-screw located in the upper plate of the upper cylindrical portion, $b'$, of the casing, the purpose of which is to limit, when desired, the upward movement of the obstruction-block at any desired point.

3. *The obstruction-block.*—C, Figs. 3, 4, and 9, represents a block of any proper size, shape, and material, but which is preferably made of metal, with a central body portion, $c$, in form like the frustum of an inverted cone, with a tube or pipe extending through it, having an upper tubular portion, $c'$, with a slot, $c^2$, extending along the same for a portion of its length, and a lower tubular portion, $c^3$, as shown. $c^4 c^4$, Fig. 3, represent standards or rods extending upward from the upper face of the block to the lower face of a horizontal plate, $c^5$, as shown. $c^6$ represents an adjusting-screw located in the upper face of the plate, the purpose of which is to limit, when desired, the upward movement of the obstruction-cap at any desired point. $c^7$, Fig. 7, represents an adjusting screw, the point of which projects into the passage-way of the lower tubular portion, $c^3$, for the purpose of contracting the normal area of the passage-way when it is desired to do so. $c^8$ represents a binding set-screw, by means of which the adjusting-screw $c^7$ is securely fastened in any position in which it may be adjusted. When the block is in its normal position of rest in the casing, the lower or outer face of the central body portion, $c$, rests upon the corresponding upper or inner face of the conical lower portion, $b^2$, of the casing and the partition $b^6$, and the outer face of its tubular portion $c^3$ bears against the corresponding inner face of the tubular portion $b^3$ of the casing with sufficient closeness to prevent the entrance of water between them, as shown in Figs. 3 and 4. By means of this construction the obstruction-block is made capable of free movement in a vertical direction, when desired, and is held and guided in its movement by the tubular portion $b^3$ of the casing, just referred to. The inner wall of the conical lower portion, $b^2$, of the casing, as clearly shown in Fig. 8, is longer in a vertical direction than the corresponding portion of the obstruction-block, as clearly shown in Fig. 11, and hence a space exists between the upper inner face of the tubular portion $b^3$ and the lower face of the obstruction-block when the latter is in its normal rest position, as shown in Figs. 3 and 4. The lower face of the obstruction-block, also, when in its normal rest position is flush with the lower edge of the partition-plate $b^6$, as shown in Fig. 4. From this construction it follows that the inlet-port is always in communication with the space below the obstruction-block.

4. *The auxiliary water-way.*—D, Figs. 1 and 2, represents the auxiliary water-way, consisting of proper pipe-sections smaller in area than the area of the main pipe, which sections lead out from the main pipe at any proper point back of the casing B in the main water-way pipe, and lead into the chamber $d$ of any proper water-meter, and out from the meter-chamber into the chamber of the casing B through the tubular portions $c^3 c'$ of the obstruction-block C, the tubular portion $c'$ having the slot $c^2$, to permit its final discharge into the upper chamber of the casing. The first pipe-section of the auxiliary water-way may lead out from the main water-way either in the direction in which the main current is flowing, as shown in detached view, Fig. 1, or in the opposite direction, as shown in the main view, Fig. 1. The last pipe-section of the auxiliary water-way is connected to the lower end of the tubular portion $b^3$ of the casing by means of screw-threads in the manner well understood. The pipe-section is connected to the threaded portion of the casing; but the water, nevertheless, owing to a close-fitting joint, flows through the tubular portion of the obstruction-block into the chamber of the casing.

5. *The obstruction-cap of the auxiliary water-way.*—E, Figs. 3, 4, and 10, represents a thimble or tubular cap located on the upper end of the tubular portion $c'$ of the block, which is adapted to move freely thereon in a vertical direction. Its movement, however, in a downward direction is so limited as to leave always exposed a small portion of the slot $c^2$, as shown. $e$ represents a stop-rod extending upward from the cap in such manner that its upper end can come in contact, when desired, with the lower end of the adjusting-screw $c^6$ in the plate $c^5$, as shown. If desired, the obstruction-block may be provided with a groove or channel, $c^9$, on the outlet side of the same, as shown in Fig. 4, for the purpose of facilitating the return of the block to its normal rest position after movement, and also to permit the passage of the smallest stream of water from the main pipe. If desired, the auxiliary water-way, instead of leading into the chamber of the casing, may have a separate discharge. In this case means for simultaneously opening and closing the two water-ways should be provided. If desired, the obstruction-cap may be dispensed with, as shown in Fig. 11.

The general operation of the parts is substantially as follows: When the water is shut off, and the moving parts consequently are in their normal rest positions, the body portion of the obstruction-block rests upon the corresponding conical bearing of the casing, as shown in Figs. 3, 4, and 11. The space beneath the block is filled by the water from the inlet-port, the same being deflected from its normal line of direction into the space beneath the block by the deflecting-plate $b^6$, Figs. 4, 8, and 11, as shown. The obstruction-cap E rests on the upper end of the tubular portion $c'$, as shown in Figs. 3 and 4. When a cock in the main pipe is opened, the resulting water-pressure at the inlet-port is exerted on the lower face of the obstruction-block, and consequently the latter is raised from its bearing, as shown in Fig. 5, into what may be termed, for convenience, its "normal" obstructing position. In this position the block is held by the continued water-pressure until the condition is changed by the closing of the cock or the opening and closing of other cocks. The block thus being held in each variation of pressure in what may be termed, for convenience, its "normal" obstructing position, the water will always be delivered in a smooth and steady flow without regard to the specific amount of pressure or flow. When the block is raised from its normal rest position by the water-pressure from the flow entering the inlet-port, proper space is afforded for the passage of the current more or less freely about the obstruction-block to and through the outlet-port. By the vertical position of the obstruction-block the area of the opening through the casing for the passage of the main stream is determined, the area of course being increased in proper definite measure as the valve is lifted. The area of the opening determines the amount of obstruction which shall be offered to the free passage of the main current, and, consequently, also the amount of water which shall be diverted from the main waterway into the auxiliary water-way. If the block occupies a high position in the casing, a large opening through the casing is made, and less obstruction consequently being offered to the flow of the main stream, a less amount is diverted into the auxiliary water-way. By adjusting, then, the vertical position of the block properly any desired amount of the entire flow can be diverted into the auxiliary water-way, and when once the proper proportion between the two streams has been determined the same proportion will be maintained under all variations of pressure.

The proper adjustment of the block for determining its normal obstructing position can be made by changing its weight, and also in part by limiting its upward movement to any desired point by means of the adjusting-screw $b^7$. This obstruction-block, it should be understood, is entirely independent of all the other parts, and hence may be independently moved in the casing. It is not in any true sense a valve, as it does not act to cause the flow, but is acted upon by the flow when the latter is caused by other means. It is simply a block suspended in the path of the main stream to determine, by means of its vertical position, the precise amount of obstruction that shall be offered to the passage of the stream. This block is lifted from its normal rest position by the water flow or pressure, and is returned thereto when the flow ceases by the action of gravitation simply, instead of by the reaction of a compressed spring, as has heretofore been done, the independent block in rising and falling affording a uniform resistance under all the variations of pressure, while the spring in rising and falling affords a resistance that is increased or diminished proportionately as the distance to which the spring is compressed is increased or diminished. By the action of the resulting water-flow when a cock is opened the obstruction-cap is lifted, as shown in Fig. 5, to permit the discharge of the water from the auxiliary waterway. The amount of its movement may be determined by the position of the adjusting-screw $c^6$ in the plate $c^5$. The obstruction-cap is not in any true sense a valve, its action being similar to that of the obstruction-block. The area of the opening, also, for the discharge of the water through the upper tubular portion may be determined by the adjusting-screw $c^7$, Fig. 7. The slot $c^2$, forming the discharge-opening of the auxiliary waterway, being located on the side opposite to the inlet-port, is in a measure protected from the violence of the incoming water-flow. The form of the obstruction block also is such as to divert the incoming water-flow from that point. By means of this construction the water from the auxiliary waterway is permitted to discharge into the chamber of the casing without being improperly affected by the violence of the incoming water-flow.

It may not be important always to employ obstructing devices in connection with the auxiliary water-way; but when such devices are employed they must be adjusted in harmony with the adjustments of the obstruction-block. By means of these two devices—the obstruction-block and the obstruction-cap—a number of adjustments are possible.

The block may be adjusted by weighting it or limiting its movement, and the cap by weighting it or limiting its movement. An adjustment also may be made by changing the area of the discharge passage of the auxiliary water-way.

By leading out the first pipe-section of the auxiliary water-way into the meter-chamber in a direction opposite to that in which the main current flows the entrance of objectionable foreign matter—such as gravel, straws, sand, &c.—is effectually prevented. By this means clear water, comparatively, is delivered to the meter, the passage connected therewith, and the obstruction-cap of the auxiliary water-way, and hence the perfect operation of these parts is insured. By locating, also, the entrance-opening of the auxiliary water-way at a point comparatively remote from the obstruction devices in the main waterway the water entering therein is entirely unaffected by the agitation which results from the obstruction of the water. By means of this extent of quiet flow, also, a better opportunity is afforded for the passage of foreign substances past the entrance-opening.

The auxiliary water-way, it will be observed, is composed of independent pipe-sections, the main parts of which are located away from and out of the line of the main water-way.

By means of the described construction and arrangement marked advantages are obtained. One part can be acted upon without affecting the other parts. For example, the meter at any time may be removed and exchanged without necessitating the removal of any other part. The casing B may be readily opened and its interior parts adjusted or changed without affecting any other part. Most of the parts also can be purchased in the market, and hence the necessity of special manufacture is avoided.

The casing B and the obstruction-block C are the only parts that need to be specially manufactured, and when these are provided the apparatus may be readily applied at any desired point by unskilled labor.

Some of the advantages resulting from the practical application of this invention to use are as follows: The desirable features of course in a measuring apparatus of any kind are accuracy, durability, simplicity of construction, ease of adjustment. All these features are possessed in a marked degree in this invention.

*Accuracy.*—By the employment of the independent obstruction-block having a capacity for independent movement the vital acting part is made entirely independent of all disturbing causes. When properly adjusted, it is perfect and complete in itself, and is acted upon to accomplish the desired purpose by two unfailing sources of power—the water flow or pressure and the action of gravitation.

*Durability.*—The parts are composed of metal or rubber, and the action is such that there is no appreciable wear. The entire absence of springs and of rubbing-surfaces insures the perpetuity of its life.

*Simplicity of construction.*—All the parts, excepting the casing and the obstruction-block, can be purchased in market, and these special parts are not difficult nor expensive to manufacture.

*Ease of adjustment.*—By simply unscrewing the upper part of the casing the block, which is almost the only part that requires adjustment, can be taken out and adjusted at will. The adjusting-screw in the upper part of the casing can then be readily reached.

The advantages resulting from the employment of the proportional system in measuring are well known and need not be referred to here.

The method of changing the position of the obstructing device in the main water-way of a proportional apparatus by the employment of the water flow or pressure, in connection with the action of gravitation, will be made the subject of a subsequent application.

I am aware of the patent of Swartz, in which an obstruction-plate controlled by a spring is employed; but accurate measurement cannot possibly be obtained when a spring is employed, for the reason that the resistance of the spring is increased more and more as the distance to which the spring is compressed is increased.

Having thus fully described my invention, what I claim as new, and desire to secure by Letters Patent, is—

1. The combination of the following elements: a main water-way, an auxiliary water-way, and a removable, independent, unattached obstruction-block located in the main water-way and adapted to be lifted by the water-flow, and to return to its seat by gravity only when the flow ceases, and when lifted to divert a proportional amount of the entire flow to the auxiliary water-way.

2. The combination of the following elements: a main water-way, an auxiliary water-way, a removable, independent, unattached obstruction-block located in the main water-way and adapted to be lifted by the water-flow, and to return to its seat by gravity only when the flow ceases, and when lifted to divert a proportional amount of the entire flow to the auxiliary water-way, and a casing in the main water-away adapted to hold and guide the block when it is being moved in a vertical direction.

3. The combination of the following elements: a main water-way, an auxiliary water-way, a removable, independent, unattached obstruction-block located in the main water-way and adapted to be lifted by the water-flow, and to return to its seat by gravity only when the flow ceases, and when lifted to divert a proportional amount of the entire flow to the auxiliary water-way, and a casing in the main water-way adapted to hold and guide the block when it is being moved in a vertical direction, the block having a diminished tubular guiding portion below the block, and a casing having a corresponding tubular guiding portion, substantially as described.

4. The combination of the following elements: a main water-way, an auxiliary water-way, a removable, independent, unattached obstruction-block located in the main water-way and adapted to be lifted by the water-flow, and to return to its seat by gravity only when the flow ceases, and when lifted to divert a proportional amount of the entire flow to the auxiliary water - way, and a meter located in the auxiliary water-way, substantially as described.

5. The combination of the following elements: a main water-way and an auxiliary water-way having a meter located therein, and a removable, independent, unattached obstruction-block located in the main water-way and adapted to be lifted by the water-flow, and to be returned to its seat by gravity only when the flow ceases, and when lifted to divert a proportional amount of the water-flow to the auxiliary water-way.

6. The casing B, having the central cylindrical portion, $b$, the conical lower portion, $b^2$, the tubular portion $b^3$, the inlet and outlet projections $b^4$ $b^5$, and the removable upper portion, $b'$, as described.

7. In combination with the ordinary pipes, A A, of the main water-way, the casing B, having the fixed inlet and outlet projections $b^4$ $b^5$ connected thereto, and the removable top portion, $b'$, the construction being such that when the top portion, $b'$, is removed the obstruction-block may be lifted out without disturbing any other part.

8. In combination with the casing B, having the tubular portion $b^3$, the obstruction-block C, having the lower tubular portion, $c^3$, as described.

9. In combination with the obstruction-block C, the casing B, constructed specifically as described, with its separable parts $b$ $b'$, lower conical portion, $b^2$, tubular portion $b^3$, deflecting-plate $b^6$, and chamber below the block, as described.

10. In combination with the casing B, having the adjusting-screw $b^7$, the obstruction-block C, having the rods $c^4$ $c^4$, and plate $c^5$, with adjusting-screw $c^6$, as described.

11. The combination of the following elements: a main water-way, an auxiliary water-way, and a casing adapted to hold an obstruction-block in such manner that it may be moved freely and independently in a vertical direction, and an independent unattached obstruction-block located in the main water-way and adapted to be lifted by the water-flow, and to return to its seat by gravity only when the flow ceases, and when lifted to divert a proportional amount of the entire flow to the auxiliary water-way.

12. The combination of the following elements: a main water-way having a casing, substantially as described, and an auxiliary water-way, substantially as described, discharging into the obstruction-block and through it to the chamber of the casing, substantially as described.

13. In combination with a main water-way, an auxiliary water-way leading out therefrom in a direction opposite to that in which the main current flows, substantially as described.

14. In combination with a main water-way and an auxiliary water-way leading out therefrom in a direction opposite to that in which the main current flows, a meter located in such relation to the entrance-opening of the water-way as to be protected from foreign substances, substantially as described.

15. In combination with a main water-way and an auxiliary water-way leading out therefrom in a direction opposite to that in which the main current flows, a meter and an obstruction-cap located in the path of the auxiliary water-way.

16. The obstruction-block C, constructed specifically as described, with the body portion $c$, the upper tubular portion, $c'$, having the slot $c^2$, and the lower tubular portion, $c^3$, as described.

17. In combination with the discharge end of the tube of the auxiliary water-way, an independently-moving obstruction-cap located over the end thereof.

18. In combination with the upper tubular portion, $c'$, of the obstruction-block C, having the slot $c^2$, the obstruction-cap E, as described.

19. In combination with an independently-moving obstruction-block, substantially as described, in the main water-way, an independently-moving obstruction-cap, substantially as described, located in the path of the auxiliary water-way.

20. The combination of the following elements: a casing in the main water-way adapted to hold an obstruction-block, an independently-moving obstruction-block adapted to determine the amount of water which shall be diverted to the auxiliary water-way, and an independently-moving cap located in the path of the auxiliary water-way.

21. The combination of the following elements: an independently-moving obstruction-block adapted to determine the proportional quantity of the entire flow which shall be diverted to the auxiliary water-way, a casing in the main water-way adapted to hold the obstruction-block in such manner that it may be freely and independently moved in a vertical direction, an auxiliary water-way leading out from the main water-way opposite to that in which the main current flows, having a meter located therein, and an independent obstruction-cap located in the path of the auxiliary water-way, as described.

22. In combination with an independently-moving obstruction-block in the main water-way, having a capacity for adjustment substantially as described, an independently-moving obstruction-cap located in the path of the auxiliary water-way, having a capacity for adjustment substantially as described.

23. The obstruction-block C, having a conical side and a tubular portion, $c'$, with slot $c^2$, the slot being located on that side of the tube which is opposite to the inlet side of the block, as described.

24. In combination with a main water-way having obstructing devices located at any proper point therein, an independent auxiliary water-way having its entrance-opening located in the main water-way at a point remote from the obstructing devices, substantially as and for the purpose described.

25. In combination with a main water-way, substantially as described, having obstructing devices located therein, an auxiliary water-way composed of a chamber and independent pipe-sections, the entrance-opening of the auxiliary water-way being located at a point remote from the obstruction devices, and the discharge-opening of the water-way being located in the casing of the obstructing-block.

26. In an apparatus, substantially as described, suitable to measure a proportional part only of a fluid passing through it, and in which an independently-moving obstruction-block is located in the main water-way, the combination of a passage arranged for the discharge of the so-measured part and connected to and leading through said block into said main water-way, substantially as described, for the purpose specified.

27. A main water-way provided at one point with an independently-moving obstruction-block, an auxiliary water-way leading from and into said main water-way, and a meter located in said auxiliary water-way, in combination with a discharge-passage through the tubular portion $c'$, leading from the auxiliary water-way of the meter and through said block into said main water-way, substantially as described.

28. A vertically-moving obstruction-block, C, having a bearing in a casing, B, and inlet and outlet ports for said block, in communication with a main water-way, A, in combination with a passage in the tubular portion $c'$, which is in communication with a meter connected with said main water-way, and leads through and opens to the casing B at one side of the block C, and is adapted to discharge in the line of direction of the travel of the fluid out of said casing B through the outlet-port, substantially as described, for the purpose specified.

29. An independently-moving obstruction-block, C, having a bearing in the casing B, and inlet and outlet ports, and provided with a passage through it in communication with said outlet-port of said block, substantially as described.

30. An independently-moving obstruction-block, C, having a bearing in a casing, B, and inlet and outlet ports, and provided with a passage through it in communication only with said outlet-port, in combination with an independently-moving obstruction-cap, E, to said passage, substantially as described, for the purpose specified.

31. An independently-moving obstruction-block, C, having a bearing in a casing, B, and inlet and outlet ports, and provided with a passage through it in communication only with said outlet-port, in combination with an independently-moving obstruction-cap, E, to said passage, adapted to be adjusted in its upward movement, substantially as described, for the purpose specified.

In testimony whereof I have hereunto set my hand in the presence of two subscribing witnesses.

D. BRAINERD SPOONER.

Witnesses:
EDWIN W. BROWN,
WM. S. BELLOWS.